Jan. 21, 1936.  D. R. SWINTON  2,028,299
SPRING LEAF SPACER
Filed June 30, 1933
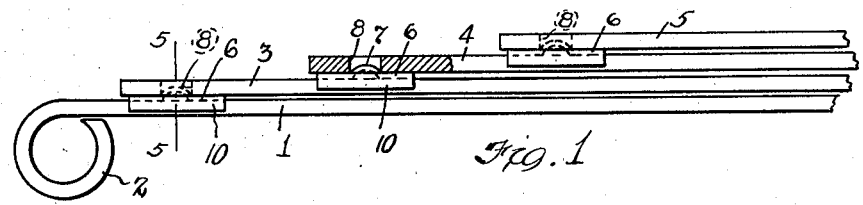
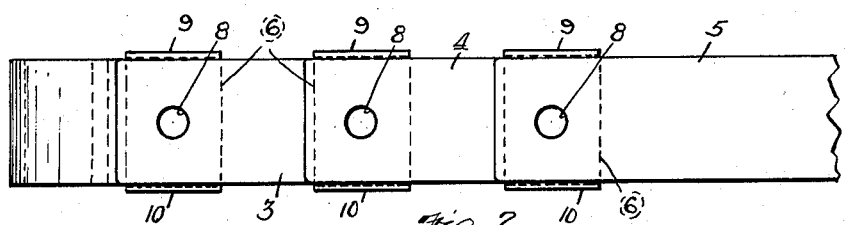
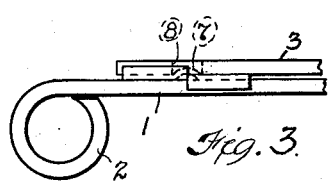
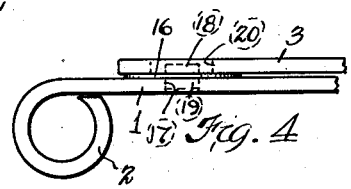
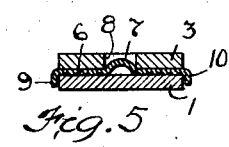
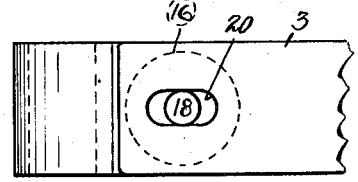
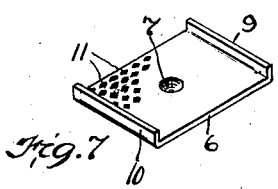
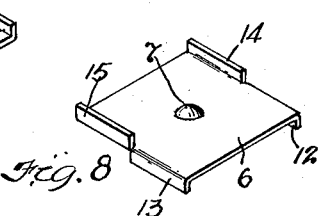
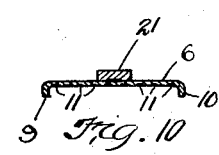
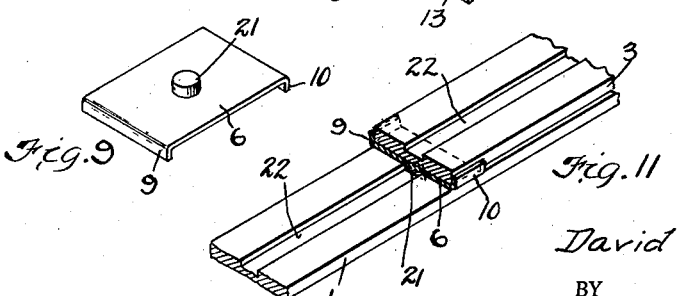
INVENTOR.
David R. Swinton
BY
Fay, Oberlin & Fay
ATTORNEYS Patented Jan. 21, 1936

2,028,299

UNITED STATES PATENT OFFICE 2,028,299

SPRING LEAF SPACER

David R. Swinton, Detroit, Mich., assignor to The Cleveland Graphite Bronze Company, Cleveland, Ohio, a corporation of Ohio Application June 30, 1933, Serial No. 678,434

2 Claims. (Cl. 267—50)

The present invention relates to a means for spacing apart the component leaves of a laminated type of spring, while at the same time properly controlling and maintaining the amount of friction between adjacent leaves. The invention also relates to a means for maintaining the proper alignment of the individual spring leaves.

It is the general object and nature of my invention, therefore, to provide a bearing plate or spacer which may be readily inserted between adjacent spring leaf surfaces in a laminated spring, together with means for securing such plate against both lateral and longitudinal movement, and retaining means incorporated into the construction of the bearing plate, which will be capable of maintaining the individual spring leaves in alignment. Further advantages shall become apparent as the following description proceeds.

To the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

In said annexed drawing:

Fig. 1 is an elevational view of a portion of a laminated leaf spring showing the spacers or bearing plates embodying the principle of my invention assembled thereon; Fig. 2 is a top plan view of Fig. 1; Figs. 3 and 4 are partial elevational views and illustrate modified forms of construction of the spacer; Fig. 5 is a sectional view taken substantially along the line 5—5 of Fig. 1; Fig. 6 is a plan view of the alternative form of construction shown in Fig. 4; Fig. 7 is a perspective view of the spacer shown in the assembly of Figs. 1 and 2; Fig. 8 is a perspective view of the alternative form of spacer shown in Fig. 3; Fig. 9 is a perspective view of a spacer similar to that shown in Figs. 1, 2, and 7, but having a different type of locking lug; Fig. 10 is a cross sectional view of Fig. 9; Fig. 11 is a perspective view showing a longitudinal groove or slot which may be provided in the spring leaves for the reception of the lug on the spacer.

Heretofore it has been the customary practice in the construction of laminated type leaf springs to assemble the individual leaves in surface to surface contact and to maintain them in alignment by means of U-shaped clamps or so-called rebound clips. In the design of such laminated type leaf springs, it is also customary to allow for a certain amount of friction between the faces of the leaves. This factor of friction is taken into account in computing the load specifications for the spring.

However, there are two factors which result in placing the computed friction estimate in error. The first is due to the fact that since the individual spring leaves are fabricated from forged or rolled stock, that their contacting surfaces are in no sense proper bearing surfaces and possess high and low points with the result that the frictional resistance will vary over a wide range in a given number of leaf springs. The second factor of error which contributes to this so-called loss of friction control resides in the fact that during use, the bearing surfaces of the spring leaves become rusted and contaminated with dirt and foreign particles whereby the original friction characteristics are greatly varied.

It has also been proposed to insert a continuous spacer having self-lubricated bearing surfaces which extend throughout the entire length of the leaves. However, such a continuous spacer still does not compensate for the uneven bearing surfaces of the leaf springs, and it has been found in practice that only a relatively small effective bearing area is produced upon such a continuous spacer due to high spots on the leaf spring surfaces themselves, with the result that such continuous spacers soon become worn through and are broken and work loose from between the leaves.

Accordingly, it is one of the objects of my present invention to eliminate the above mentioned disadvantages by means of interposing bearing plates between the rubbing surfaces of the laminated leaves, such bearing plates having surfaces which will more effectively and more permanently maintain the desired coefficient of friction between the adjacent spring leaves.

There are also associated in the construction of these bearing plates, flanges and projections adapted to engage with the spring leaves and to maintain the latter in alignment, thereby rendering possible the elimination of retaining or rebound clips.

Now referring more particularly to the drawing, in Figs. 1 and 2 there has been shown a laminated leaf spring section consisting of the main leaf 1 having the shackle bolt eye 2. The spring leaves 3, 4, and 5, each of a progressively shorter length are imposed in alignment upon the main leaf 1. Bearing plates 6 are then inserted between each one of these respective leaves at a point adjacent the end thereof. The medial portion of the bearing plate 6 may have a struck-up lug or projection 7 which is adapted to be received within the recess or aperture 8 in the ends of the individual spring leaves. In this manner, the bearing plate 6 is locked against both lateral and longitudinal movement with respect to one of the two leaves between whose surfaces it is interposed. Laterally extending flanges 9 and 10 are provided on each side of the bearing plate 6 and are adapted to engage with the edges of that particular spring leaf upon which the bearing plate is free to move. In this manner, it will be seen that the two adjacent spring leaves are maintained in alignment with respect to each other, while at the same time relative longitudinal movement is permitted.

In a modified form of construction as shown in Figs. 3 to 8, the main portion of the bearing plate 6 has two downwardly depending flanges 12 and 13 which are adapted to engage with the sides of one spring leaf and two upwardly extending flanges 14 and 15 which are adapted to engage with the other and adjacent spring leaf.

As shown in Fig. 7, it is contemplated that a plurality of recesses 11 may be disposed in the bearing surface of the plate 6, such recesses being filled with a lubricating material such as graphite or the like whereby the bearing surface of the plate is rendered self-lubricating.

In the alternative form of construction illustrated in Figs. 4 and 6, the bearing plate is made in disc form as indicated by the numeral 16, rather than being of rectangular shape. The bearing disc 16 has the projecting lugs 17 and 18 extending from each face thereof. The lug 17 is received in a complementary aperture 19 in one of the spring leaves. The lug 18 is adapted to fit within a longitudinally extending slot 20 in the other of the spring leaves whereby the certain desired longitudinal movement between the spring leaves and the bearing plate is allowed. As shown in Figs. 9 and 10, instead of punching out a projection 7 from the central portion of the bearing plate 6, a small cylindrical projection or stud 21 may be spot welded to the plate.

In Fig. 11 there has been shown a fragmentary view of two adjacent spring leaves 1 and 3 in each of which a continuous longitudinal groove or channel 22 has been formed. The stud 21 on one face of the bearing plate is adapted to fit and be longitudinally movable in the channel 22.

It is also contemplated that the bearing plate or spacer constructed according to the above described specifications be fabricated from a non-corrosive material such as bronze, brass or stainless steel. The provision of a self-lubricating surface on the bearing plate not only insures proper control and maintenance of the coefficient of friction between the bearing surfaces, but also minimizes or practically eliminates operating noise.

Other modes of applying the principle of my invention may be employed instead of the ones explained, change being made as regards the mechanism herein disclosed, provided the means stated by any of the following claims or the equivalent of such stated means be employed.

I therefore particularly point out and distinctly claim as my invention:

1. In a spacer for spring leaves, the combination of a self-lubricating bearing plate adapted to be inserted between adjacent spring leaf surfaces, said plate having a plurality of recesses in its surface, graphitic material filling said recesses, and laterally extending flanges on said plate projecting above and below said plate and adapted to engage with the sides of the adjacent spring leaves.

2. In a spacer for spring leaves, the combination of a self-lubricating bearing plate adapted to be inserted between adjacent spring leaf surfaces, said plate having a plurality of recesses in its surface, graphitic material filling said recesses, and a recess in one of said spring leaves, a projecting lug on said plate adapted to be received in said recess, and lateral flanges projecting above and below said plate and adapted to engage with the sides of adjacent spring leaves.

DAVID R. SWINTON.